(12) United States Patent
Huovila et al.

(10) Patent No.: US 7,781,937 B2
(45) Date of Patent: Aug. 24, 2010

(54) PIEZOELECTRIC GENERATOR SYSTEM THAT INCLUDES AN ENERGY STORAGE

(75) Inventors: Henrik Huovila, Tampere (FI); Vesa Kulmala, Tampere (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 350 days.

(21) Appl. No.: 11/596,931

(22) PCT Filed: May 20, 2005

(86) PCT No.: PCT/FI2005/050171

§ 371 (c)(1),
(2), (4) Date: Jul. 8, 2008

(87) PCT Pub. No.: WO2005/114826

PCT Pub. Date: Dec. 1, 2005

(65) Prior Publication Data

US 2009/0039733 A1      Feb. 12, 2009

(30) Foreign Application Priority Data

May 21, 2004    (FI) .................................. 20045190

(51) Int. Cl.
*H01L 41/08*     (2006.01)
(52) U.S. Cl. .................. 310/319; 310/329; 310/339
(58) Field of Classification Search ................ 310/317, 310/319, 329, 339
See application file for complete search history.

(56) References Cited

U.S. PATENT DOCUMENTS

| | | | |
|---|---|---|---|
| 4,210,898 A | 7/1980 | Betts | |
| 4,504,761 A | 3/1985 | Triplett | |
| 5,801,475 A * | 9/1998 | Kimura | 310/319 |
| 6,580,177 B1 | 6/2003 | Hagood, IV et al. | |
| 6,995,496 B1 * | 2/2006 | Hagood et al. | 310/317 |
| 7,138,750 B2 * | 11/2006 | Mancosu et al. | 310/339 |
| 7,415,874 B2 * | 8/2008 | Mancosu et al. | 73/146.5 |
| 7,429,801 B2 * | 9/2008 | Adamson et al. | 290/1 R |

(Continued)

FOREIGN PATENT DOCUMENTS

DE              20311429 U       9/2003

(Continued)

OTHER PUBLICATIONS

Teknisia Tietoja Ja Taulukoita (Abb Stromberg); Vaasa Oy, 1990.

(Continued)

*Primary Examiner*—Mark Budd
(74) *Attorney, Agent, or Firm*—Venable LLP; Eric J. Franklin (57) ABSTRACT

A device for producing electric energy including a first element converting mechanical energy into electric energy. The level of the electric energy is variable according to the variations of the mechanical energy. A controller block is connected to the first element for providing measurement data on the basis of the electric energy produced by the first element. The controller block includes a detector block to examine the electric energy produced by the first element to form the measurement data. A first energy storage unit stores electric energy produced by the first element and provides the electric energy for the operation of the controller block. Also, a system, a tire and a method.

15 Claims, 5 Drawing Sheets

U.S. PATENT DOCUMENTS

| | | |
|---|---|---|
| 7,679,271 B2 * | 3/2010 | Genis et al. ................. 310/339 |
| 2003/0146676 A1 | 8/2003 | Mancosu et al. |
| 2005/0030177 A1 | 2/2005 | Albsmeier et al. |

FOREIGN PATENT DOCUMENTS

| | | |
|---|---|---|
| EP | 1022702 A2 | 7/2000 |
| GB | 2307044 A | 5/1997 |
| WO | WO-03/034366 A1 | 4/2003 |
| WO | WO-2004/030948 A1 | 4/2004 |

OTHER PUBLICATIONS

PCT/ISA/210—International Search Report—Jul. 6, 2005.
PCT/ISA/237—Written Opinion of the International Searching Authority—Jul. 6, 2005.
PCT/IPEA/409—International Preliminary Report on Patentability—Aug. 3, 2006.

* cited by examiner

PIEZOELECTRIC GENERATOR SYSTEM THAT INCLUDES AN ENERGY STORAGE

CROSS-REFERENCE TO RELATED APPLICATIONS

This application claims priority to Finnish patent application 20045190 filed 21 May 2004 and is the national phase under 35 U.S.C. 371 of PCT/FI2005/050171 filed 20 May 2005.

FIELD OF THE INVENTION

The present invention relates to an arrangement for electric energy production especially in small scale. The invention relates to a device for producing electric energy comprising a first piezo element converting mechanical energy into electric energy, the level of the electric energy being variable according to the variations of the mechanical energy, a controller block connected to the first piezo element for providing measurement data on the basis of the electric energy produced by the first piezo element. The invention relates to a system comprising a device for producing electric energy comprising a first piezo element converting mechanical energy into electric energy, the level of the electric energy being variable according to the variations of the mechanical energy, a controller block connected to the first piezo element for providing measurement data on the basis of the electric energy produced by the first piezo element. The invention also relates to a tyre comprising a device for producing electric energy comprising a first piezo element converting mechanical energy into electric energy, the level of the electric energy being variable according to the variations of the mechanical energy, a controller block connected to the first piezo element for providing measurement data on the basis of the electric energy produced by the first piezo element. The invention further relates to a method for producing electric energy converting mechanical energy into electric energy in a first piezo element, the level of the electric energy being variable according to the variations of the mechanical energy, providing measurement data on the basis of the electric energy produced by the first piezo element.

BACKGROUND OF THE INVENTION

There are a number of devices in which a small scale energy production is needed because it may be impossible or at least very difficult to provide energy sources like batteries for such devices. Some non-limiting examples of such devices are tyres comprising a sensor for measuring or sensing some properties of the tyre, for example the air pressure, temperature etc., product sensors attached to a package of the product, for example for producing indication on the conditions by which the product has been affected during transportation and/or storage.

Such sensors are often implemented using short range wireless communication technology i.e. the sensors transmit information by using e.g. radio waves. These kind of sensors are generally called as RFID sensors (Radio Frequency Identification). The RFID sensors need electric energy when information is transmitted to or received from a reader device. In some implementations the energy needed in the RFID sensor is produced by the reader device in the form of an electromagnetic field. However, the distance between the reader device and the RFID sensor should be kept rather small and the energy available at the RFID sensor is very small thus making the RFID technology of prior art not applicable to all applications.

Some efforts have been made to produce electric energy for a device by using a piezo generator. A piezo generator is a device which converts mechanical energy to electric energy using a piezoelectric transducer such as piezoelectric film. However, the energy level produced by such a piezo generator has been quite low for some applications utilising the RFID sensors.

SUMMARY OF THE INVENTION

One aim of the present invention is to provide an arrangement for producing energy in a more efficient manner than in prior art. The invention is based on the idea that the same piezo which produces the measurement data also generates the energy for the operation of the measurement unit which examines the measurement data to produce a signal for further analysis of the measurement data. In an example embodiment an output stage for the piezo generator is controlled in such a manner that it drains the energy from the piezo element at a stage when the voltage level is at a peak level or near it. To put it more precisely, the device according to the present invention is primarily characterised by that the controller block also comprises     a detector block to examine the electric energy produced by the first element to form the measurement data, and     a first energy storage unit for storing electric energy produced by the first element and for providing the electric energy for the operation of the controller block.

The system according to the present invention is primarily characterised by that the controller block comprises     a detector block to examine the electric energy produced by the first element to form the measurement data, and     a first energy storage unit for storing electric energy produced by the first element and for providing the electric energy for the operation of the controller block.

The tyre according to the present invention is primarily characterised by that the controller block comprises     a detector block to examine the electric energy produced by the first element to form the measurement data, and     a first energy storage unit for storing electric energy produced by the first element and for providing the electric energy for the operation of the controller block.

The method according to the present invention is primarily characterised by that the method also comprises     examining the electric energy produced by the first element to form the measurement data,     storing electric energy produced by the first element into a first energy storage unit and for providing the electric energy for the operation of the controller block.

According to an example embodiment of the present invention there is provided a system where two piezos are used, a measuring piezo for sensor and a power piezo for generating power, and where the measuring piezo is also used to produce power for a measuring and driver circuit.

The invention provides advantages compared with prior art systems and methods. The device and system according to the present invention can utilize more of the electric energy produced by the piezo generator than prior art devices and systems. Therefore it is possible and reasonable to use the piezo generator as a power source in many applications in which it has not been possible so far. The invention makes it possible to avoid the usage of batteries or other such energy sources in many applications, especially in RFID applications.

DESCRIPTION OF THE DRAWINGS

In the following the invention will be described in more detail with reference to the attached figures, in which FIG. 7b depicts the position of the tyre with respect to the curve of FIG. 7a.

DETAILED DESCRIPTION OF THE INVENTION

Piezo Generator Block Diagram

The piezo generator 1 is composed of four functional parts, some of which can be physically connected. The measuring piezo provides supply current to a controller to drive the output stage. The voltage waveform of the piezo is used to measure the timing information. The power piezo provides high voltage high impedance pulses, which the switched mode output stage converts to a low voltage. Measuring and power piezo can be separate or produced to a common piezo substrate. The piezo substrate may be etched to produce the wiring for connecting the voltages generated by the piezo elements 2, 3 to other circuitry. In the same way the controller and output stage can be separate or on the same printed circuit board.

Figure 1:
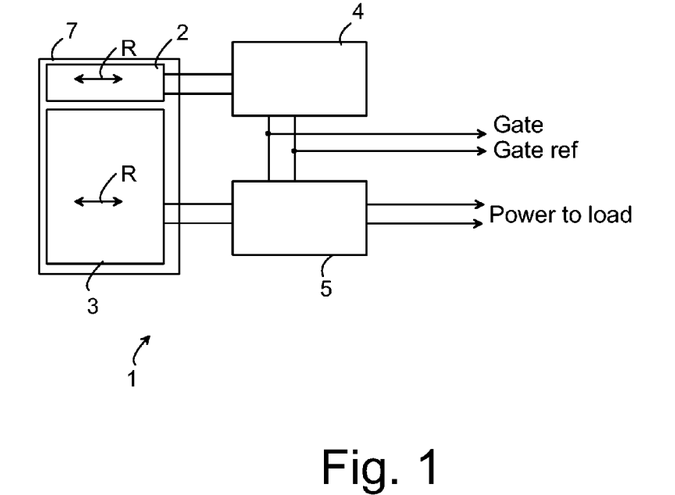
FIG. 1 shows a device according to an example embodiment of the present invention as a simplified block diagram.

The block diagram of FIG. 1 shows the main blocks of the piezo generator 1 according to an example embodiment of the present invention. The piezo generator comprises a first piezo element 2 and a second piezo element 3. The first piezo element 2 is used as a sensor i.e. it provides measurement data of the strain of an object. Other data can be derived on the basis of the measurement data. For example, the derived data can include information on air pressure inside a tyre, information on temperature of the tyre, wheel load etc. The first piezo element is connected to a controller block 4 which receives the measurement data from the first piezo element 2. When an external force stretches or presses the first piezo element 2 (i.e. the shape of the first piezo element 2 changes) the voltage across the first piezo element 2 changes. The controller block 4 can use these voltage variations as the measurement data. Additionally, the electric energy produced by the first piezo element 2 is used to supply electric energy for the operation of the controller block 4. The operation of the controller block 4 will be described later in this application.

The arrows R in FIG. 1 illustrate the direction of the strain which bring about the energy production of the piezo elements 2, 3.

The second piezo element 3 is used as an energy source for providing energy for other devices which may be connected to the piezo generator 1. The second piezo element 3 is also affected by an external force causing variations in the shape of the second piezo element 3. Due to these shape variations the second piezo element 3 generates electric energy which is provided to the output block 5. The output block 5 converts this energy into suitable form as will be described later in this application.

The first 2 and the second piezo element 3 can be separate or attached to a common substrate 7. In the same way the controller block 4 and output block 5 can be separate or on the same substrate, for example on the same printed circuit board. In the embodiment in which the piezo generator 1 comprises at least the first 2 and the second piezo element 3, they should be assembled in such a way that the strains of the first 2 and the second piezo element 3 behave substantially similarity.

Controller Block

Figure 2A:
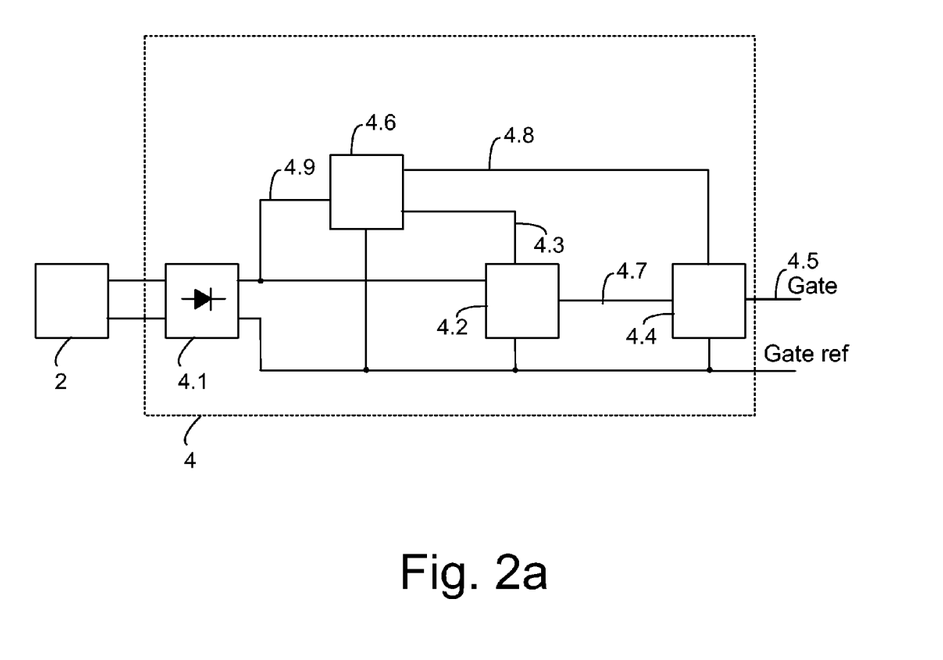
FIG. 2a shows an example of a controller block of the device according to the present invention as a simplified block diagram.

An example of the controller block 4 is depicted in FIG. 2a. The controller block 4 has three main functions. First, the combination of a full wave rectifier 4.1 and the storage block 4.6 provides power supplies to a detector block 4.2 and to the one-shot block 4.4. Second, the detector block 4.2 detects the right triggering times by a derivation of the storage block supply signal 4.9. Third, the output pulses generated by the detector block 4.2 are used to trigger the one-shot block 4.4. The storage block supply signal 4.9 is generated from the voltage generated by the first piezo element 2 and rectified by the full wave rectifier 4.1. The voltage levels of the detector block supply signal 4.3, the one-shot supply signal 4.8 and the storage block supply signal 4.9 are limited when necessary by the storage block 4.6.

When the storage block supply signal 4.9 starts to decrease (the first triggering point) the detector block 4.2 triggers a one-shot block 4.4 which can be made of mosfets, for example. The output signal 4.7 produced by the detector block 4.2 is used to trigger the one-shot block 4.4 which produces a control signal 4.5 (a pulse) to the output block 5 to store energy from the second piezo element 3. The storage block supply signal 4.9 decreases to substantially zero and after that begins to rise again. At the next peak level (the second triggering point) the detector block 4.2 triggers the one-shot block 4.4 again to provide the control signal 4.5 (another pulse) to the output block 5 to store energy from the second piezo element 3. In other words, the output block 5 can store energy from the second piezo element 3 at every pulse.

Figure 2B:
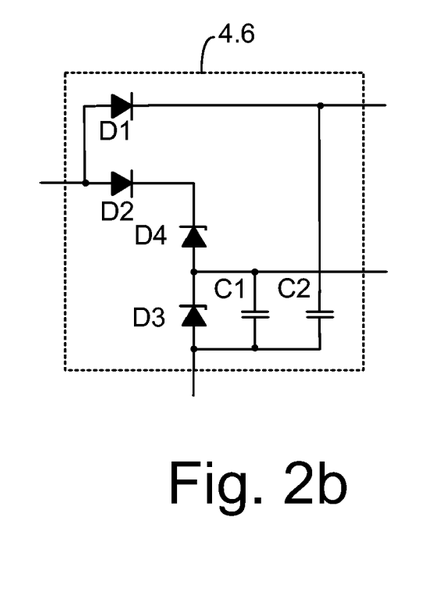
FIG. 2b shows an example coupling of the storage block of the controller block of FIG. 2a, FIG. 3 shows an example of an output stage of the device according to the present invention as a simplified block diagram.

When the controller block 4 is made of low current components it may draw less than 1 μA quiescent current. In FIG. 2b an example circuit of the storage block 4.6 is depicted. The zener diodes D3, D4 provide certain supply voltage levels for the detector block 4.2 and for the one-shot block 4.4. The purpose of the diodes D1, D2 is to isolate the detector block supply signal 4.3 from the one-shot supply signal 4.8. In some embodiments the separation may not be needed wherein the same supply voltage may be connected to both the detector block 4.2 and the one-shot block 4.4. The capacitor C2 is charged by the voltage from the rectifier 4.1 through the diode D1. The capacitor C2 stores enough energy to power the output stage 5 when it is triggered. The benefit of this circuit is the elimination of any energy storage or other circuit to start operation. By the inventive arrangement the energy production is started from the very first movement of the first piezo element 2.

Figure 4A:
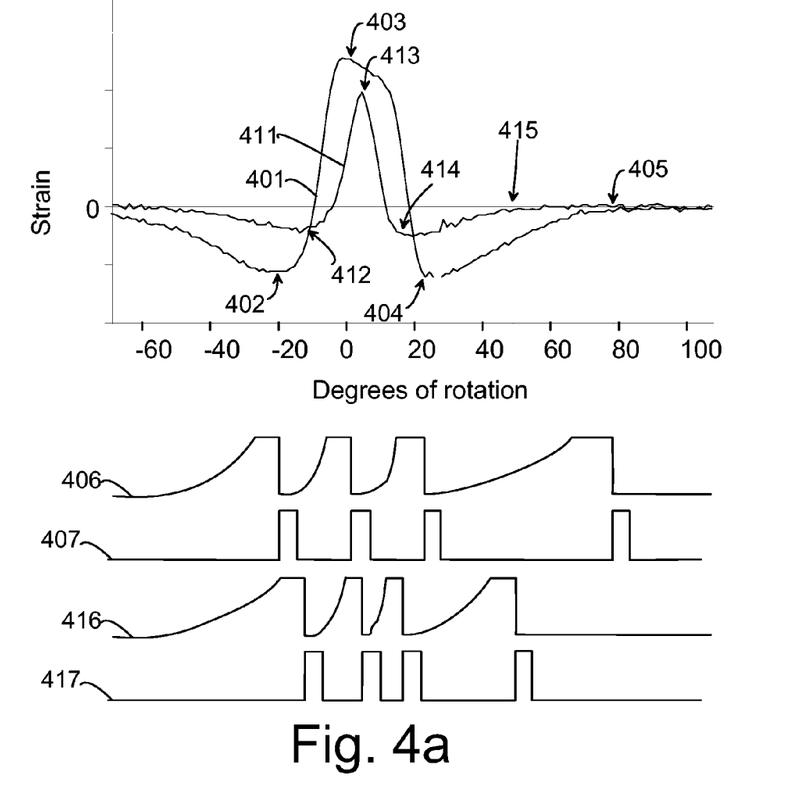
FIG. 4a depicts examples of waveforms of the controller block with different loads directed to the tyre.

Some waveforms of the controller block 4 are presented in FIG. 4a. The curve 401 illustrates an example of the strain of the first piezo element 2. The waveform of the voltage from the second piezo element is quite similar to the waveform of the strain but after the full wave rectifier the negative voltages are inverted to positive voltages. Therefore, the positive peaks of the storage block supply signal 4.9 are detected. The first triggering point is shown by the arrow 402, the second triggering point is shown by the arrow 403, the third triggering point is shown by the arrow 404 and the fourth triggering point is shown by the arrow 405. The curve 406 illustrates the waveform of the controller supply voltage at the output nodes of the full wave rectifier 4.1 and the curve 407 illustrates the pulses generated by the one-shot block 4.4 at the triggering points 402, 403, 404, 405. It can be seen from the waveform 406 of the controller supply voltage that when the first piezo element 2 begins to generate electric energy the voltage begins to rise until the zener diode D3 limits the voltage at a certain level. When the output block 5 is controlled to begin the storage of energy (at the first triggering point 402) the controller voltage supply falls near zero and begins to rise again until the zener diodes D3, D4 limit the voltage at a certain level. At the beginning of the second pulse (at the second triggering point 403) the voltage drops to zero or near zero. The capacitor C1 stores enough energy for the operation of the detector block 4.2 despite of the voltage drops during the output pulses of the one-shot block 4.4.

There is also another curve 411 in FIG. 4a. It illustrates another example of the strain of the first piezo element 2 when the load affecting to the tyre is smaller and/or the air pressure in the tyre is bigger than in the situation of the curve 401. The triggering points of this example are shown by the arrows 412, 413, 414 and 415, respectively. The curve 416 illustrates the waveform of the controller supply voltage at the output nodes of the full wave rectifier 4.1 and the curve 417 illustrates the pulses generated by the one-shot block 4.4 at the triggering points 412, 413, 414, 415.

Output Block

Figure 3:
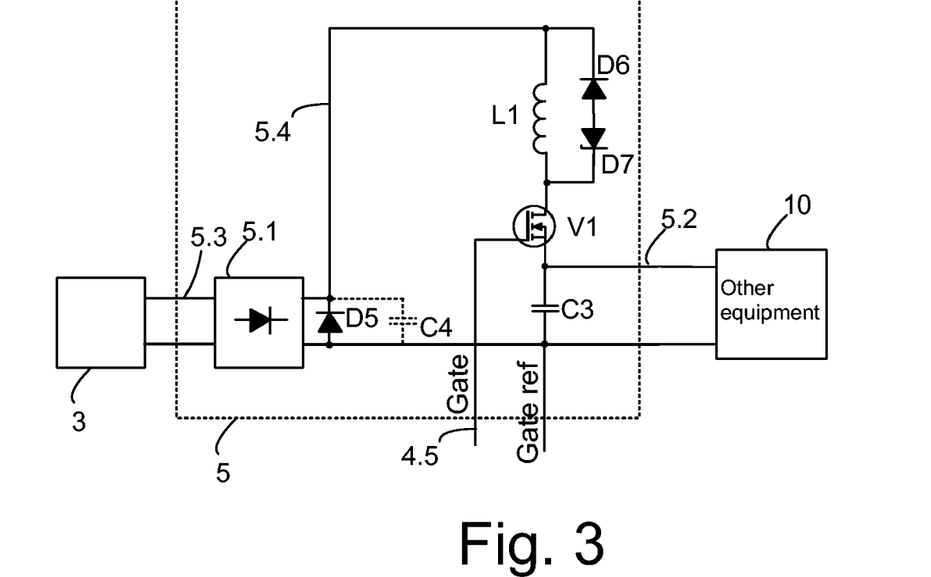
Figure 5:
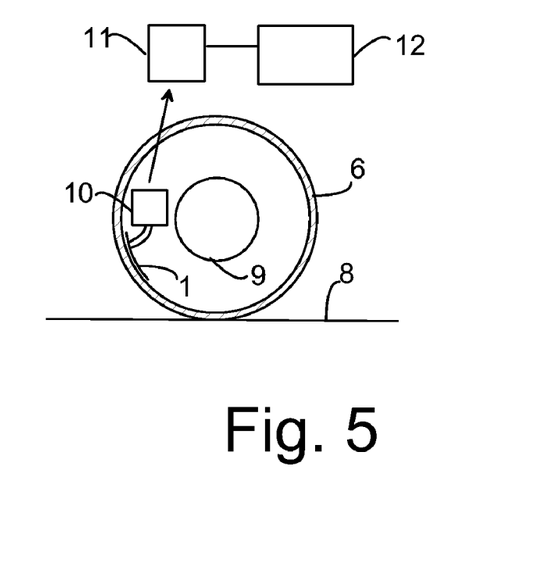
FIG. 5 shows an example of a system according to the present invention as a simplified block diagram.

An example of the output block 5 is depicted in FIG. 3. The output block 5 comprises a full wave rectifier 5.1, a coil L1, a fet V1 and an output capacitor C3. The working cycle of the output block consists of few phases. At first the fet V1 is off. When the second piezo element 3 stretches or contracts the voltage of the line 5.4 starts to rise. Because both the first 2 and the second piezo element 3 are attached near each other and preferably on the same substrate, also the first piezo element 2 stretches or contracts, respectively. Therefore, also the voltage of the storage block supply signal 4.9 starts to rise. When the voltage of the line 5.4 is substantially at a maximum the storage block supply signal 4.9 is also at the maximum or near it. Thus, the one-shot block 4.4 of the controller block 4 drives the GATE signal (the control signal 4.5 of FIG. 2) high which switches the fet V1 on. Current starts to flow trough the coil L1 and the fet V1 to the output capacitor C3. Also the voltage of the line 5.4 starts to drop. Current rising rate is limited by the inductance of the coil L1. When the voltage of the line 5.4 substantially reaches zero most of the energy produced by the second piezo element 3 is stored in the coil L1. Then the current is transferred to the diode D5 and the current starts to decrease. Energy from the coil L1 is transferred to the capacitor C3. The capacitor C3 provides a storage for the energy generated by the second piezo element. The energy can further be output from the output 5.2 to another device 10, for example to a transmitter (FIG. 5). It is also possible to use a battery instead of or in parallel with the capacitor C3. Shortly after the current substantially reaches zero the signal at the line GATE goes low switching the fet V1 off and the circuit is at the starting state. The GATE REF signal from the controller block 4 is connected to the other output of the rectifier. However, the GATE REF signal can also be connected, for example, to the source of the fet V1. An optional capacitor C4 can be connected parallel to D5 to limit the maximum of the rectified voltage generated by the second piezo element 3. Effectively the optional capacitor C4 is parallel with the capacitance of the second piezo element 3. A diode D6 and a zener D7 limit the voltage spikes across the coil L1 and the fet V1 in a case in which the fet V1 is turned off while current is still flowing through L1. The maximum output voltage is limited by the zener D7 and by the amplitude of the signal at the line GATE. One of the innovations of this circuit is the use of the fet V1 as both a high side switch and a low side switch: the high side switch in respect to the output 5.2 and the low side switch for the coil L1. The circuit has at least two benefits. First, because the output voltage at the output 5.2 is relatively low the signal level at the line GATE can also be low. Second, the circuit does not need any duty cycle regulation. It will be enough to set the pulse at the line GATE long enough to transfer substantially all of the available energy from the second piezo element 3 to the output 5.2.

The voltage generated by the piezo elements 2, 3 have a varying nature due to the variations in the mechanical forces affecting to the piezo elements 2, 3. These variations affect that the voltage have multiple local maxima and minima. Different maximum values are not necessarily the same but may differ from each other. Therefore, in the description of the invention the word maximum does not necessarily mean a global maximum or an absolute maximum of the voltage but a local maximum i.e. a peak value after which the voltage begins to decrease.

Figure 4B:
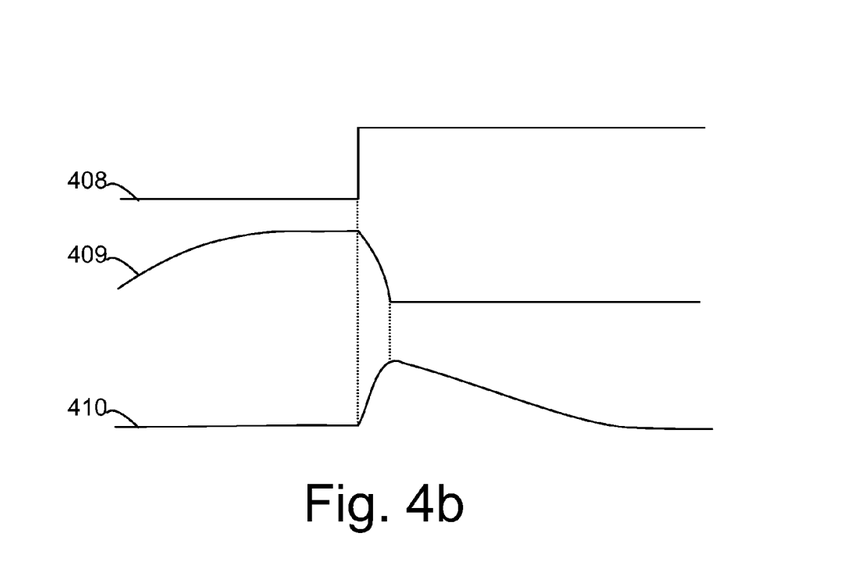
FIG. 4b depicts examples of waveforms of the output stage.

Some waveforms of the output block 5 are presented in FIG. 4b. The curve 408 illustrates the rising edge of the pulse generated by the one-shot block 4.4 at any of the triggering points 402, 403, 404, 405 (FIG. 4a). The curve 409 illustrates the waveform of the voltage of the line 5.4 at the output nodes of the full wave rectifier 5.1 of the output block 5 and the curve 410 illustrates the current flowing through the coil L1.

Although the output voltage of the output block 5 is limited the voltage supplied from the second piezo element 3 is not limited in this example embodiment. On the other hand, the controller supply voltage may need to be limited as was shown in the description of the operation of the controller block 4 to avoid damages to the electronics of the controller block, especially to the detector block 4.2.

Piezo Generator Assembly

There are a number of alternative usages and assembly possibilities for the piezo generator 1 according to the present invention. The first piezo element 2 should be assembled so that the measurement data it provides is appropriate in the light of the application and also the energy produced by the first 2 and the second piezo element 3 were as large as possible. In the embodiment in which the piezo generator 1, which comprises at least the first 2 and the second piezo element 3, is assembled inside a tyre 6 the piezo elements should be assembled in parallel with each other in the direction of rotation of the tyre 6. The arrows R in FIG. 1 illustrate the direction of rotation which also means the direction of the stretching or contracting of the piezo elements 2, 3.

Figure 6:
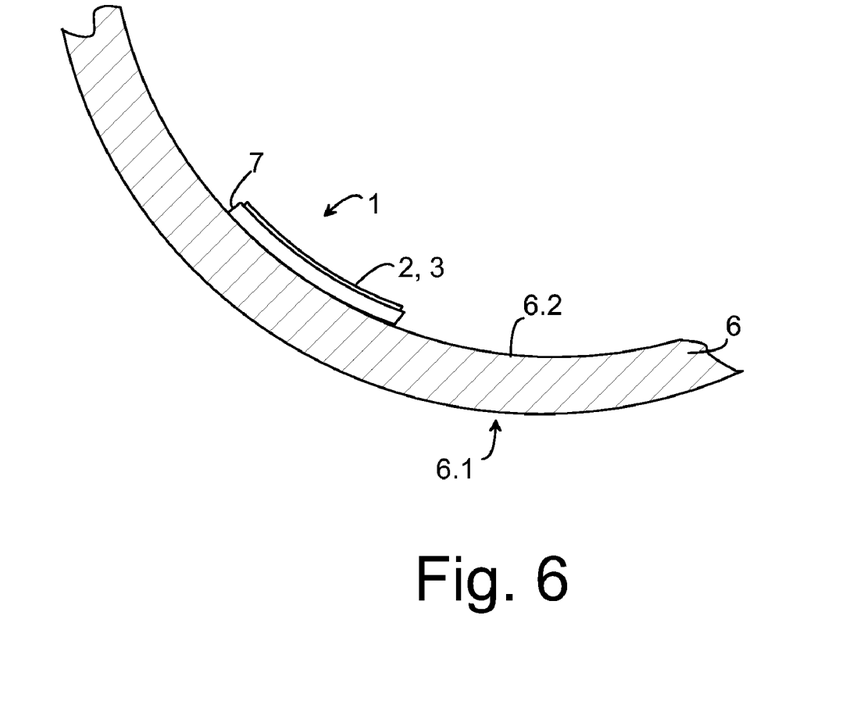
FIG. 6 illustrates an example of the positioning of the piezo generator inside a tyre.

In an example embodiment shown in FIG. 6 the piezo generator 1 is assembled inside a tyre 6. The first 2 and the second piezo element 3 are attached or otherwise produced on the same substrate 7. The substrate 7 is made, for example, of rubber or other elastic material which allows the piezo elements 2, 3 to stretch and contract. The substrate 7 is assembled on the inner surface of the tyre 6, preferably on the opposite surface 6.2 of the tyre tread 6.1. The substrate 7 is, for example, fixed to the tyre 6 by gluing. The controller block 4 and the output block 5 of the piezo generator 1 can be assembled more freely but it is also possible that the controller block 4 and the output block 5 are also assembled on the same substrate 7 with the piezo elements 2, 3. The controller block 4 and the output block 5 may even be assembled outside the tyre, for example on the rim 9 on which the tyre 6 is assembled. However, it should be noted that although the currents flowing between the piezo elements 2, 3 and the other parts 4, 5 of the piezo generator 1 are not very strong, the lengths of the wires between the piezo elements 2, 3 and the controller block 4 and the output block 5 should be kept as short as possible to keep the power losses as small as possible.

Figure 7A:
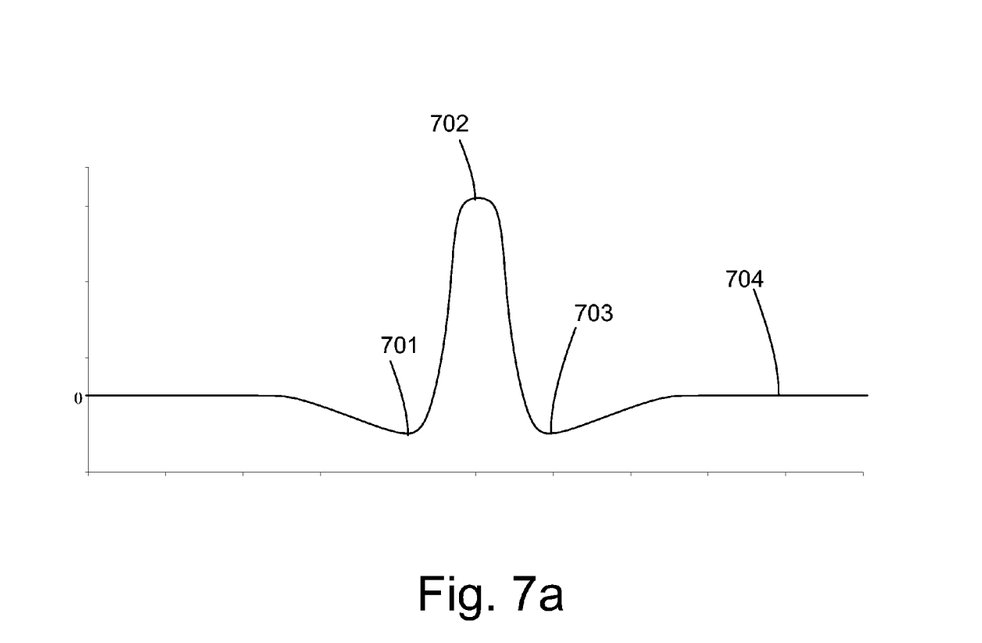
FIG. 7a depicts another example of the waveform of the voltage generated by the piezo element.
Figure 7B:
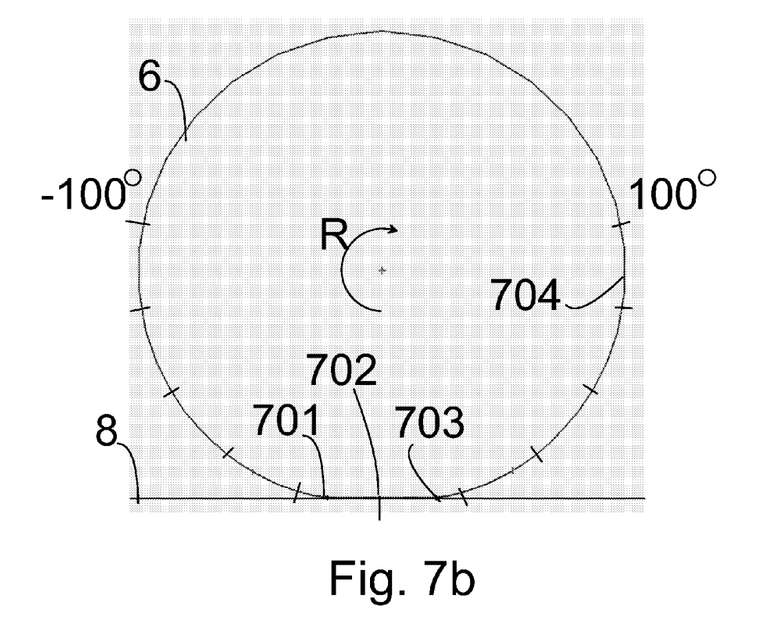

In FIG. 7 an example waveform of the voltage generated by the first and the second piezo element is depicted. FIG. 7b shows the rotation angle of the tyre 6 with respect to the waveform of FIG. 7a. The references 701-704 in FIG. 7a relate to the rotation angle of the tyre 6 with respect to the centreline of the location of the piezo elements 2, 3 in the tyre. The same references are also shown in FIG. 7b showing the relationship between the rotation angles and the respective strain of the piezo elements 2, 3. The references 701, 703 represent the maximum curvature points, the reference 702 represents a point in the contact patch area (the area in which the tyre 6 and the surface 8 are in contact), and the reference 704 represents a point in the neutral area of the tyre 6 (the area of the tyre 6 which is not contacting the surface). The side profile of the tyre 6 is usually circular in the neutral area.

When the tyre rotates on a surface 8 the tyre is occassionally in a position in which piezo elements 2, 3 are beginning to start to stretch or contract. In this position that section of the tyre 6 where the piezo elements 2, 3 are located is starting to be in contact with the surface 8. Because the tyre 6 is normally affected by some weight, for example the weight of the vehicle (not shown) to which the tyre is attached, that section changes its form. The extent of the changes depend on inter alia the air pressure inside the tyre, the wheel load and the temperature of the tyre. The changes in the form of the tyre 6 at the location of the piezo elements 2, 3 also causes forces to the piezo elements 2, 3 wherein the piezo elements 2, 3 can generate electric energy. In an example embodiment the force affected to the piezo elements 2, 3 can be deduced on the basis of the waveform of the curves 401, 411 in FIG. 4a and also on the basis of the waveform in FIG. 7a.

Preparing the Piezo Element

In the following an example of the preparation of the piezo elements 2, 3 are described in more detail. A Piezo plate of e.g. type MSI 1-1004346-0 PVDF coated with silver ink is cut into pieces. The stretching direction of the pieces of the piezo plate are marked. The electrodes for the piezo elements 2, 3 are connected on opposite sides of the pieces. The electrode contact areas are short circuited from side to side by making small holes through the film. The piezo elements 2, 3 are attached to the substrate 7.

Piezo Connections

Piezo electrical connections are made, for example, with flexible wire, braided copper wire, tin and conducting silver paint. Mechanical connection may be strengthened with thermally contractible insulation and glue.

Measurement System

In FIG. 5 an example of the system in which the piezo generator 1 according to the present invention is depicted. In this example the system is intended to measure the air pressure of the tyre 6 and provide an alarm if the air pressure falls below some threshold. The system comprises the piezo generator 1, a transmitter 10, a receiver 11, and the analysis block 12. The piezo generator 1 is attached on the inner surface of the tyre 6. The transmitter 10 may also be assembled inside the tyre 6 or on the rim 9 of the tyre. The receiver 11 is assembled in the vehicle to which the tyre 6 is assembled. The receiver 11 is connected with the analysis block 12.

In operation the piezo generator 1 produces measurement data and energy for an external equipment, for example for the transmitter 10. In this embodiment the first piezo element 2 produces the measurement data and also the energy for the controller block 4. The second piezo element 3 produces energy for the transmitter 10 and, when necessary, for other components (not shown) of the system which are coupled with the piezo generator 1 (inside the tyre 6 or in the rim 9). The output 5.2 of the output stage 5 is connected to the transmitter 10 for providing energy for the operation of the transmitter 10. The output of the one-shot block 4.4 can be connected to an input of the transmitter 10 to provide the measurement data i.e. the pulses to the transmitter 10. The transmitter 10 transmits information on the pulses e.g. timing information of the pulses to the receiver 11. The transmission is performed in a wireless manner, for example by radio signals.

The receiver 11 receives the information and forwards it to the analysis block 12. The analysis block 12 can analyse the conditions of the tyre 6 for example on the basis of the timing information of the pulses. The analysis block 12 may comprise a table or other kind of data to be used in the analysis.

The transmitter 10 does not normally need a battery or other energy source when the energy is generated by the piezo generator 1 according to the present invention. Therefore, the invention makes it possible to implement e.g. RFID technology in many areas.

Although it was described above that the piezo generator 1 comprises two piezo elements 2, 3 the invention is not restricted to such implementations only. For example, the piezo generator 1 comprises only one piezo element which can be used to provide energy for the controller block 4, the output block 5 and also for the other parts the piezo generator 1 is connected to. In that embodiment the output block 3 is also connected to the piezo element. An additional components such as diodes may be needed to provide separation of supply voltages of different parts of the piezo generator 1. It is also possible that the piezo generator 1 may comprise more than two piezo elements.

The invention claimed is:
1. A device for producing electric energy comprising:
a first piezo element converting mechanical energy into electric energy, the level of the electric energy being variable according to the variations of the mechanical energy;
a controller block connected to the first piezo element for providing measurement data on the basis of the electric energy produced by the first piezo element;
a detector block to examine the electric energy produced by the first piezo element to determine the moment of a triggering point on the basis of the level of the electric energy produced by the first piezo element;
a second piezo element on the same substrate with the first piezo element converting mechanical energy into electric energy, the level of the electric energy being variable according to the variations of the mechanical energy; and
a first energy storage unit for storing electric energy produced by the first element and for providing the electric energy for the operation of the controller block;
wherein the control block comprises a controlling unit for controlling the voltage conversion to convert electric energy produced by the second piezo element when the triggering point is detected.

2. The device according to claim 1, further comprising:
an output block for providing electric energy to another device, wherein the output block is a voltage converter which converts the voltage produced by the second piezo element to a voltage level suitable for said another device.

3. The device according to claim 2, wherein controller block is adapted to control the operation of the output block.

4. The device according to claim 1, wherein controller block comprises a pulse generator for producing a pulse when the triggering point is detected, wherein the controlling unit is adapted to control the voltage conversion during the pulse.

5. The device according to claim 4, wherein the measurement data comprises pulses produced by the pulse generator.

6. A system, comprising:
a device for producing electric energy, the device comprising
a first piezo element converting mechanical energy into electric energy, the level of the electric energy being variable according to the variations of the mechanical energy;
a controller block connected to the first piezo element for providing measurement data on the basis of the electric energy produced by the first piezo element;
a detector block to examine the electric energy produced by the first piezo element to determine the moment of a triggering point on the basis of the level of the electric energy produced by the first piezo element;
a second piezo element on the same substrate with the first piezo element converting mechanical energy into electric energy, the level of the electric energy being variable according to the variations of the mechanical energy; and
a first energy storage unit for storing electric energy produced by the first piezo element and for providing the electric energy for the operation of the controller block;
wherein the control block comprises a controlling unit for controlling the voltage conversion to convert electric energy produced by the second piezo element when the triggering point is detected.

7. The system according to claim 6, wherein the device further comprises an output block for providing electric energy to another device, wherein the output block is a voltage converter which converts the voltage produced by the second piezo element to a voltage level suitable for said another device.

8. The system according to claim 7, wherein controller block is adapted to control the operation of the output block.

9. The system according to claim 6, wherein controller block comprises a pulse generator for producing a pulse when the triggering point is detected, wherein the controlling unit is adapted to control the voltage conversion during the pulse.

10. The system according to claim 9, wherein the measurement data comprises pulses produced by the pulse generator.

11. The system according to claim 6, wherein the device further comprises an analysis block for analysing the measurement data.

12. A tire, comprising:
a device for producing electric energy, the device comprising
a first piezo element converting mechanical energy into electric energy, the level of the electric energy being variable according to the variations of the mechanical energy,
a controller block connected to the first piezo element for providing measurement data on the basis of the electric energy produced by the first piezo element,
a detector block to examine the electric energy produced by the first piezo element to determine the moment of a triggering point on the basis of the level of the electric energy produced by the first piezo element;
a second piezo element on the same substrate with the first piezo element converting mechanical energy into electric energy, the level of the electric energy being variable according to the variations of the mechanical energy; and
a first energy storage unit for storing electric energy produced by the first piezo element and for providing the electric energy for the operation of the controller block;
wherein the control block comprises a controlling unit for controlling the voltage conversion to convert electric energy produced by the second piezo element when the triggering point is detected.

13. The tire according to claim 12, further comprising:
a transmitter for transmitting measurement data outside the tyre.

14. The tire according to claim 13, wherein the measurement data includes information relating to at least one of the following:
the air pressure inside the tyre
the temperature of the tyre,
the wheel load.

15. A method for producing electric energy, comprising:
converting mechanical energy into electric energy in a first piezo element, the level of the electric energy being variable according to the variations of the mechanical energy;
providing measurement data on the basis of the electric energy produced by the first piezo element;
examining the electric energy produced by the first piezo element to determine the moment of a triggering point on the basis of the level of the electric energy produced by the first piezo element;
converting mechanical energy into electric energy in a second piezo element formed on the same substrate with the first piezo element, the level of the electric energy being variable according to the variations of the mechanical energy;
storing electric energy produced by the first piezo element into a first energy storage unit and for providing the electric energy for the operation of the controller block; and
controlling the voltage conversion to convert electric energy produced by the second piezo element when the triggering point is detected.

* * * * *